United States Patent [19]

Kuhn

[11] Patent Number: 4,790,292

[45] Date of Patent: Dec. 13, 1988

[54] COOKING VESSEL

[75] Inventor: Jacques Kuhn, Rikon, Switzerland

[73] Assignee: Heinrich Kuhn Metallwarenfabrik AG, Rikon, Switzerland

[21] Appl. No.: 923,334

[22] Filed: Oct. 27, 1986

Related U.S. Application Data

[63] Continuation-in-part of Ser. No. 543,793, Oct. 21, 1983, abandoned, which is a continuation of Ser. No. 379,976, Apr. 19, 1982, abandoned, which is a continuation of Ser. No. 825,488, Aug. 17, 1977, abandoned.

[30] Foreign Application Priority Data

Oct. 31, 1985 [CH] Switzerland ............... 4682/85

[51] Int. Cl.4 .............................. A47J 27/00
[52] U.S. Cl. .................. 126/390; 219/10.493
[58] Field of Search ............. 126/273.5, 373, 375, 126/376, 390; 220/68, 69, 94 R, 94 A, 408; 219/10.49 R, 10.67, 10.79

[56] References Cited

U.S. PATENT DOCUMENTS

| | | | |
|---|---|---|---|
| 1,164,845 | 12/1915 | Murphy | 126/273.5 |
| 2,024,454 | 12/1935 | Justheim | 126/390 X |
| 2,057,254 | 10/1936 | Sommer | 126/390 X |
| 2,298,814 | 10/1942 | Weis | 206/508 X |
| 2,378,446 | 6/1945 | Soday | 126/390 X |
| 2,518,483 | 8/1950 | Mapes | 126/390 X |
| 3,837,330 | 9/1974 | Lanigan et al. | 126/246 |
| 4,533,807 | 8/1985 | Minamida | 126/390 X |
| 4,544,818 | 10/1985 | Minamida | 126/390 X |
| 4,564,001 | 1/1986 | Maeda | 126/390 |
| 4,596,236 | 6/1986 | Eide | 126/390 |
| 4,614,852 | 9/1986 | Matsushita et al. | 126/390 X |
| 4,653,469 | 3/1987 | Miyaji et al. | 126/390 |

Primary Examiner—Margaret A. Focarino
Attorney, Agent, or Firm—Weiser & Stapler

[57] ABSTRACT

A cooking vessel suitable for use with induction plates as well as with conventional electric cooking plates, ceramic hobs or gas cookers has an inner wall, an outer wall, and a thermally conductive plate arranged along the bottom of the vessel and between the inner and outer walls. The outer wall is formed of a composite material having an outer layer of a rust-proof material, a middle layer of a ferromagnetic material, and an inner layer of a rust-proof material. The inner wall is connected to the outer wall in a gas-tight manner along the rim of the vessel.

19 Claims, 5 Drawing Sheets

COOKING VESSEL

RELATED CASES

This is a continuation-in-part of U.S patent application Ser. No. 543,793, filed Oct. 21, 1983, which is itself a continuation of U.S. patent application Ser. No. 379,976, filed Apr. 19, 1982 and since abandoned, which is in turn a continuation of U.S. patent application Ser. No. 825,488, filed Aug. 17, 1977 and since abandoned.

BACKGROUND OF THE INVENTION

The present invention relates generally to cooking vessels, and in particular, to an efficient cooking vessel which is particularly well suited to various different types of heating.

German Patent Specification No, 2,734,733 describes a double-walled cooking vessel which has proved to be highly successful because it is very good for cooking on an open flame, and on conventional electric cookers with a metal or ceramic cover. Because of its double-walled construction, a high thermal efficiency is achieved during cooking and food remains hot for a long time. The plate metal base of the cooking vessel provides stability and good heat conduction over the entire bottom surface, and serves as a means for accumulating heat to keep food hot for a longer period.

Induction cookers have recently become known in which an induction coil is arranged under the cooking vessel support, for heating purposes. At present, these induction cookers generally operate at a frequency of, for example, 25 kHz. Cooking vessels made of sheet iron or cast iron, with or without corrosion protection, as well as cooking vessels made of a composite material with a layer of ferromagnetic material and an outer layer of rust-proof material, are suitable for use with such induction cookers.

Induction cookers have a high thermal efficiency, and can be regulated very easily. This is because in contrast with conventional electric cooking plates, there is practically no loss of heat between the electrical power supply and the cooking vessel. Rather, the heat is generated directly in the ferromagnetic portions of the cooking vessel by means of eddy currents. Consequently, induction cookers combine the advantages of gas cooking with those of conventional electric cookers.

However, the known cooking vessels for use with induction cookers exhibit various disadvantages. For example, cooking vessels made of sheet iron or cast iron have poor heat distribution across their bottom surfaces because of their lower thermal conductivity in relation to copper or aluminum. Moreover, under heat, these bottom surfaces can deform to such an extent that the transmission of heat between the cooking plate and the cooking vessel is inefficient, especially when the cooking vessel is used on a conventional electric cooker with a metal or ceramic cover.

In addition, to prevent corrosion during storage and use, cooking vessels made of sheet iron have to be protected either by enamelling or by electro-deposited lacquer, oil or grease surface coatings. Such protective coverings, particularly enamelling, are sensitive to impacts along the rim of the cooking vessel, requiring the rim to be protected by a metal coating or a protective strip. Where composite materials are concerned, the periphery of the rim of the cooking vessel is still often susceptible to corrosion because the ferromagnetic layer is exposed, especially after the cooking vessel has been cleaned in dish-washing machines, leading to similar considerations.

The cooking vessel described in German Patent Specification No. 2,734,733 is therefore generally unsuitable for use with induction cookers. Although it would be possible for the bottom plate (preferably made of a material of good conductivity) to be made of a ferromagnetic material, the efficiency of such a cooking vessel on a conventional cooking plate would be impaired because such materials are relatively poor conductors of heat, and the cooking vessel would be heavy and unwieldy. Moreover, the stability of the bottom surface would tend to be insufficient to meet the requirements for use with conventional heat sources. Increasing the thickness of the outer wall for reasons of stability would only serve to reduce the efficiency for induction purposes, as a result of screening effects.

SUMMARY OF THE INVENTION

It is therefore the primary object of the present invention to provide a universal cooking vessel which is ideally suited to induction heating, conventional electric heating and heating with an open flame.

This and other objects are achieved by a cooking vessel comprised of a pot having an inner wall, an outer wall, and a thermally conductive plate arranged along the bottom of the pot and between the inner and outer walls; and a double-walled lid having a bearing surface for resting upon and within a recessed annular surface formed in the inner wall of the pot so that the lid and pot meet along a widened circumferential rim.

For further details regarding preferred cooking vessels according to the present invention, reference is made to the detailed description which follows, taken in conjunction with the following illustrations.

BRIEF DESCRIPTION OF THE DRAWINGS

In the several views provided, like reference numerals denote similar structures.

DETAILED DESCRIPTION OF PREFERRED EMBODIMENTS

Figure 1:
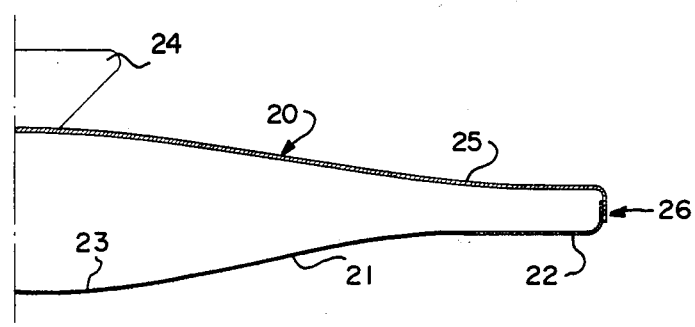
FIG. 1 shows a partial and exploded, cross-sectional view of the lid, pot and base of a cooking vessel according to the present invention.
Figure 1:
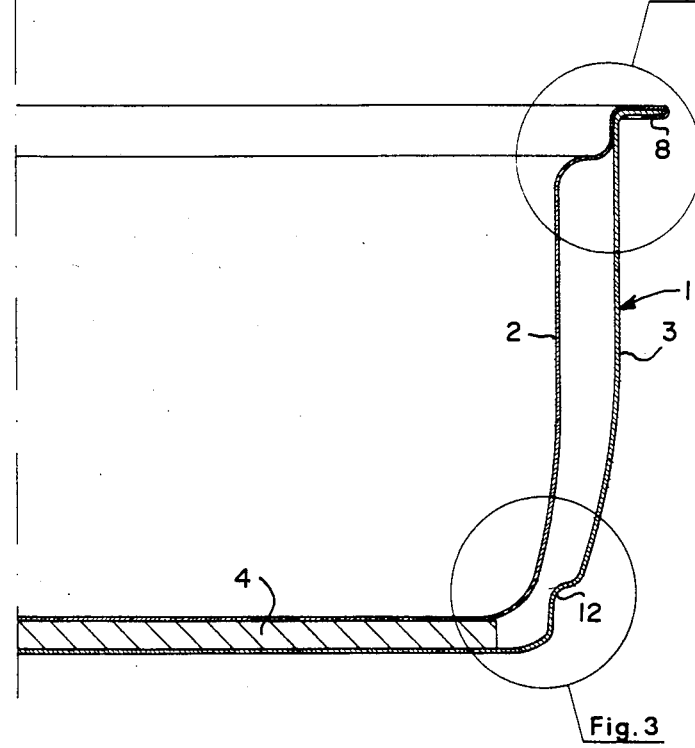
Figure 1:
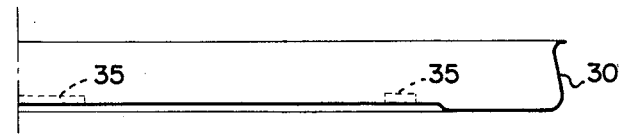
Figure 2:
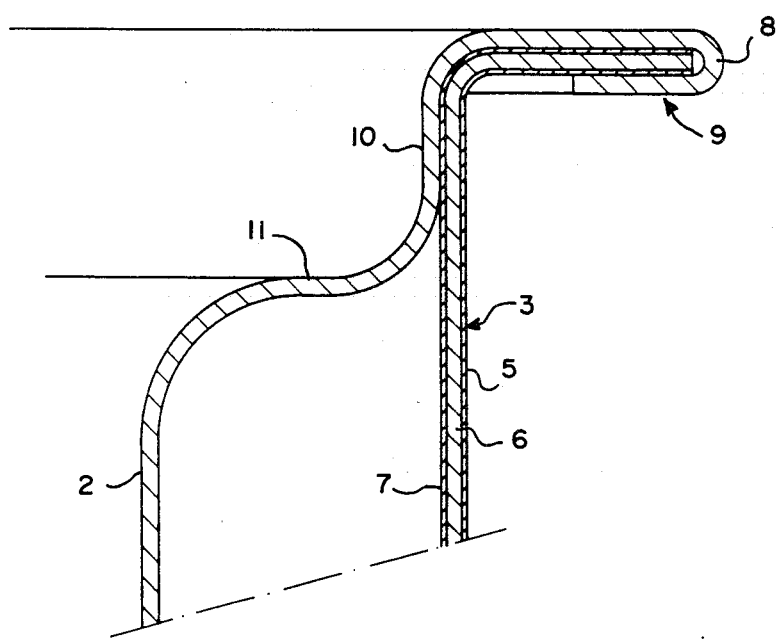
FIG. 2 shows an enlarged, partial, cross-sectional view of the rim of the pot shown in FIG. 1.
Figure 3:
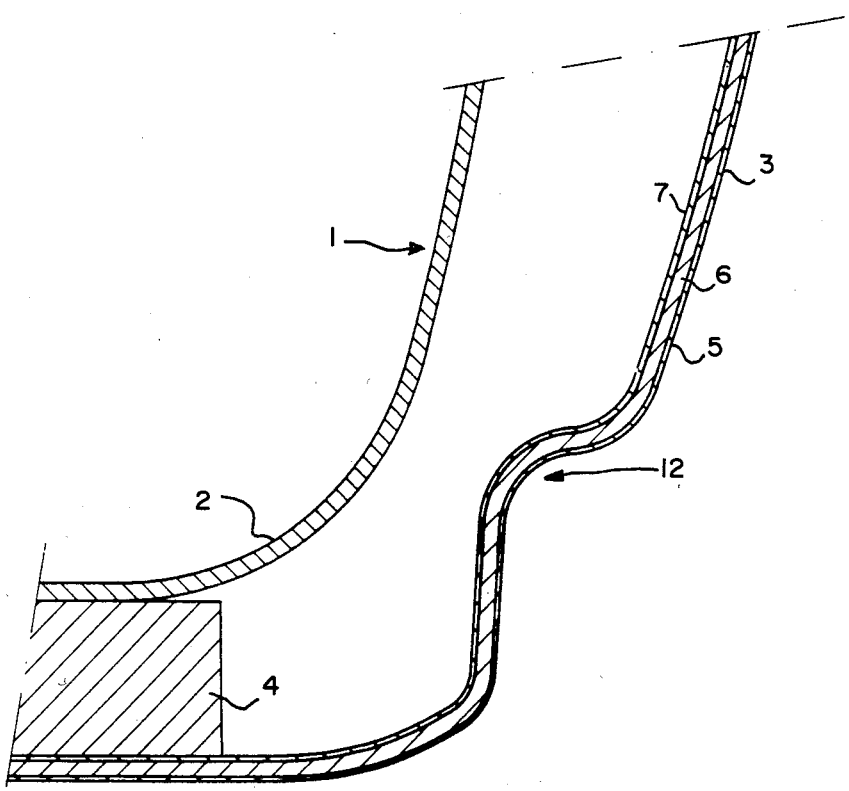
FIG. 3 shows an enlarged, partial, cross-sectional view of the bottom of the pot shown in FIG. 1.

FIGS. 1 to 3 illustrate a double-walled cooking vessel according to the present invention. The pot 1 of the cooking vessel has an inner wall 2 and an outer wall 3. A plate 4 of good thermal conductivity (e.g., aluminum) is positioned at the bottom of the pot 1, between the inner wall 2 and the outer wall 3, and is connected both to the inner wall 2 and to the outer wall 3. This assures good heat transmission between the outer wall 3 and the inner wall 2, and a uniform heat distribution over the entire bottom surface.

The outer wall 3 of the vessel is preferably formed of a composite material (best shown in FIG. 2) including an outer layer 5 which is preferably formed of stainless steel, a middle layer 6 which is preferably formed of a ferromagnetic material (e.g., iron), and an inner layer 7 which is preferably formed of stainless steel. At the rim 8 of the vessel, the inner wall 2 is flanged around the outer wall 3 so as to connect the inner and outer walls in a gas-tight manner, usually by means of a weld at 9. The ferromagnetic middle layer 6 is consequently masked and protected against corrosion along the peripheral face of the rim 8. The rim 8 is also strengthened and made burr-free as a result of such construction. Instead of the welded seam 9, a soldered joint or an adhesive bond is also possible.

Using commercially available materials, the outer wall 3 is preferably kept to less than 1.2 mm thick, and preferably is approximately 0.8 mm thick. The advantage of this is that only minimal heat is conducted to the outer (vertical) side wall of the vessel. At the same time, the two layers 5, 7 are preferably kept to less than 0.2 mm thick, to ensure a high efficiency.

Because the ferromagnetic middle layer 6 is relatively thin, shunts could arise as a result of the depth of penetration of the alternating field if this layer were connected directly to the electrically conductive material (e.g., aluminum) forming the plate 4. This would considerably reduce the power which could be transmitted to the plate 4 by an induction cooker. The inner layer 7 (stainless steel) of the outer wall 3 which is located between the plate 4 and the middle layer 6 of ferromagnetic material serves to prevent such shunting to the extent possible, so that a high efficiency can be achieved using an induction cooker. Because the relatively thick plate 4 serves to effectively conduct heat, the temperature distribution over the entire bottom surface is enhanced. At the same time, a high stability is obtained under heat. The resulting cooking vessel is therefore ideally suited to induction cookers, as well as conventional electric cookers and heating with an open flame.

The lid 20 (See FIG. 1) for the vessel also preferably includes two walls; an inner lid wall 21 and an outer lid wall 25. At the peripheral edge 26, the two lid walls 21, 25 at least partially overlap one another, and are connected to one another along this overlap in a gas-tight manner. This can be accomplished by welding, soldering or adhesive bonding.

Referring to FIG. 2, along the rim 8 of the pot 1, the inner wall 2 has an annular surface 11 which drops towards the inside of the pot 1, and which has a vertical wall 10. The periphery of the inner lid wall 21 has a bearing surface 22 which corresponds to the recessed annular surface 11 of the inner wall 2 of the pot 1. The height of the vertical wall 26 is preferably approximately equal to that of the vertical wall 10 of the pot 1 from the continuous rim 8 to the annular surface 11. Thus, an unbroken transition can be developed at the gap between the rim 8 and the outer lid wall 25.

The inner lid wall 21 is generally convex from the bearing surface 22 toward the center 23. The outer lid wall 25 is likewise generally convex, with outer portions which approximately parallel the rim 8 of the pot 1. The center of the lid 20 includes a knob 24, for use as a handle. This construction has been found to be advantageous in handling the steam which often forms inside the vessel during cooking. When the cooking temperature of the food is reached, resulting steam flows between the annular surface 11 and the bearing surface 22, condensing on the cooler vertical wall 10 of the inner wall 2 of the pot 1 or on the vertical wall 26 of the lid 20. Eventually, the condensate runs down, penetrating between the annular surface 11 and the bearing surface 22, forming a seal so long as there is no excess pressure capable of lifting off the lid 20 (which is made rather heavy by its double-walled design). This seal has a beneficial effect, particularly during cooking at temperatues below the boiling point of water, because it prevents the escape of liquid in the form of steam. Indeed, this makes waterless cooking possible.

However, an important precondition for this is that the inner surface of the pot 1 (usually a stainless steel produced, e.g. by deep-drawing) should be dimensionally stable. The simplest way to ensure this is to make the rim 8 of the pot 1 wide so as to project outwardly, and by connecting the rim 8 to the outer wall 3 in a gas-tight manner. Dimensional stability is further reinforced by the stepped profile of these structures.

Referring to FIG. 3, the outer wall 3 of the pot 1 is also step-shaped near the bottom surface, preferably including a generally cylindrical portion 12 onto which a base 30 can be attached for purposes of heat insulation. With the base 30 attached, the cooking vessel can be used to keep food hot, and as a serving piece. To be noted is that with the base 30 attached, the entirety of the cooking vessel becomes double-walled, and consequently thermally insulated. Food can therefore remain hot for a long time. Moreover, in the event that the bottom of the pot 1 becomes soiled, the base 30 makes it possible to place the cooking vessel on a dining table without soiling or marking the table.

For ease of use, the heat-insulating base 30 is releasably connected to the cooking vessel, preferably by means of a clamping effect, as illustrated in the drawings. However, the base 30 can also be provided with permanent magnets 35 (shown in phantom in FIG. 1) which rest against the outer wall 3 when the base 30 is attached, adhesion being ensured by the ferromagnetic layer 6 of the composite material used.

Figure 4:
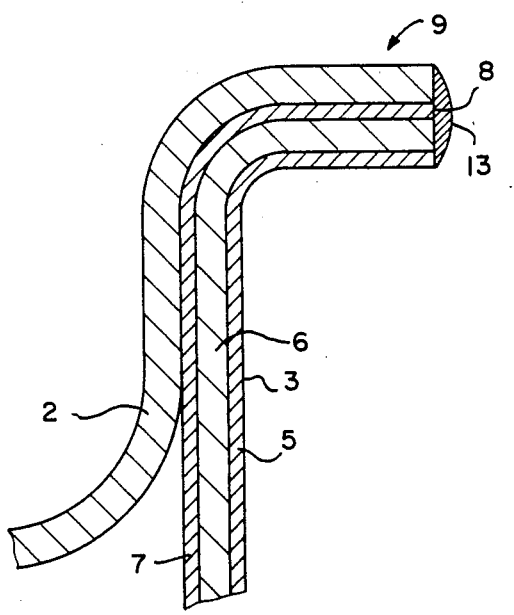
FIGS. 4 and 5 are enlarged, partial, cross-sectional views similar to FIG. 2, showing alternative embodiment rims.

In the embodiment shown in FIG. 4, the inner wall 2 and the outer wall 3 are cut flush on their peripheries along the welding seam 9. A coating 13 is provided to protect the exposed rim 8, and in particular the ferromagnetic layer 6, by bridging the inner wall 2 and the outer layer 5 of the composite material. Such a coating can be produced by electroplating or by means of a build-up welding.

Figure 5:
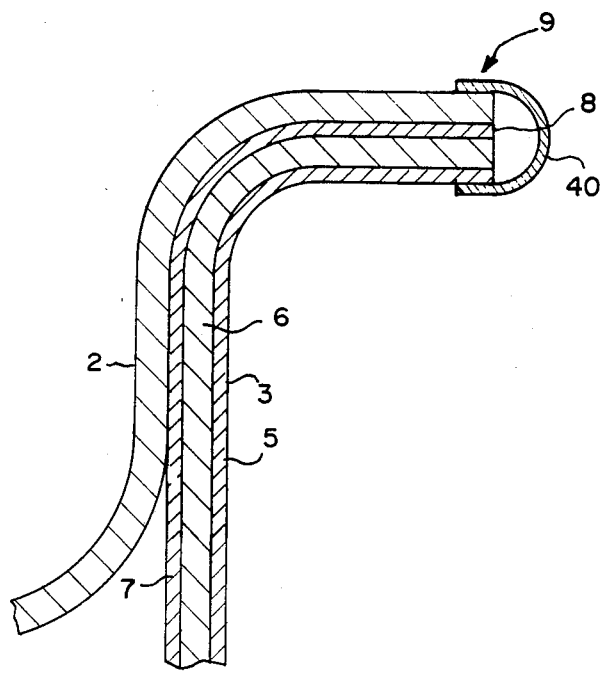

In the embodiment shown in FIG. 5, a similarly unprotected rim 8 is covered with a collar 40 of corrosion resistant material, which may be attached to the rim, e.g., by soldering, welding or adhesive bonding.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A cooking vessel adapted for use on induction plates and for electric or flame cooking, heating and serving, and including a pot having an inner wall and an outer wall, each of which are continuously formed shells connected to one another in spaced relation to one another, a heat-conducting plate connected between bottom portions of the inner wall and the outer wall in a heat-conducting manner, and a double-walled lid;

wherein the pot and the lid are stepped in their contact zone including a recessed annular surface in the inner wall of the pot and a matching bearing surface of the lid so that the lid is embedded in the pot, and the pot and the lid meet along a widened circumferential rim for ensuring dimensional stability along the rim;

wherein at least the outer wall of the pot is produced from a composite material having at least one layer formed of a ferromagnetic material; and wherein the inner wall and the outer wall of the pot are connected to one another in a gas-tight manner at the rim.

2. The cooking vessel of claim 1 wherein the composite material has three layers, and wherein the ferromagnetic material is a middle layer covered on both sides by a layer of rust-proof material.

3. The cooking vessel of claim 2 wherein the thickness of the outer wall is at most 1.2 mm.

4. The cooking vessel of claim 3 wherein the thickness of each of the layers of rust-proof material is at most 0.2 mm.

5. The cooking vessel of claim 1 wherein the inner wall is flanged over the periphery of the outer wall along the rim.

6. The cooking vessel of claim 1 wherein the inner wall is flush with the outer wall along the rim, and wherein the inner wall is connected to the outer wall by an electroplated region to cover the ferromagnetic layer.

7. The cooking vessel of claim 1 wherein the inner wall is flush with the outer wall along the rim, and wherein the rim is covered with a collar formed of a corrosion resistant material.

8. The cooking vessel of claim 1 wherein the inner wall is welded, soldered or adhesively bonded to the outer wall along the rim.

9. The cooking vessel of claim 1 including means for releasably connecting a heat-insulating base to bottom portions of the pot.

10. The cooking vessel of claim 9 wherein lower portions of the outer wall of the pot have a continuous band for clamping the base thereto.

11. The cooking vessel of claim 1 including a heat insulating base having a magnet for attachment to the pot.

12. The cooking vessel of claim 1 wherein the inner wall of the lid is convex from portions resting on the rim of the pot toward the center of the lid.

13. The cooking vessel of claim 1 wherein the lid has a rim which is removably seated upon the rim of the vessel to create a ring-shaped intermediate zone in which water can condense and accumulate, and flow back into the vessel.

14. The cooking vessel of claim 13 wherein the water which condenses and accumulates in the ring-shaped intermediate zone at least partially fills the ring-shaped intermediate zone, thereby contributing to insulation between the rim of the lid and the rim of the vessel upon which it is removably seated.

15. The cooking vessel of claim 13 wherein the rim of the vessel includes a generally horizontal, ring-shaped seat for receiving a generally horizontal, ring-shaped face of the rim of the lid, and a generally vertical face for containing a generally vertical outer face of the rim of the lid.

16. The cooking vessel of claim 1 wherein the heat conducting plate is aluminum.

17. A cooking vessel adapted for use on induction plates and for electric or flame cooking, heating and serving, and including a pot having an inner wall and an outer wall, each of which are continuously formed shells connected to one another in spaced relation to one another, a heat-conducting aluminum plate connected between bottom portions of the inner wall and the outer wall in a heat-conducting manner, and a double-walled lid;

wherein the pot and the lid a re stepped in their contact zone including a recessed annular surface in the inner wall of the pot and a matching bearing surface of the lid so that the lid is embedded in the pot to create a ring-shaped intermediate zone in which water can condense and accumulate, and flow back into the vessel, to at least partially fill the ring-shaped intermediate zone to contribute to insulation between the rim of the lid and the rim of the vessel upon which it is removably seated;

wherein the pot and the lid meet along a widened circumferential rim for ensuring dimensional stability along the rim;

wherein at least the outer wall of the pot is produced from a composite material having at least one layer formed of a ferromagnetic material; and wherein the inner wall and the outer wall of the pot are connected to one another in a gas-tight and dimensionally stable manner at the rim.

18. The cooking vessel of claim 17 wherein the rim of the vessel includes a generally horizontal, ring-shaped seat for receiving a generally horizontal, ring-shaped face of the rim of the lid, and a generally vertical face for containing a generally vertical outer face of the rim of the lid.

19. The cooking vessel of claim 18 wherein the composite material has three layers including the one layer formed of a ferromagnetic material covered on both sides by a layer of stainless steel having a thickness of at most 0.2 mm, and wherein the composite material has a thickness of at most 1.2 mm.

* * * * *